Patented May 23, 1933

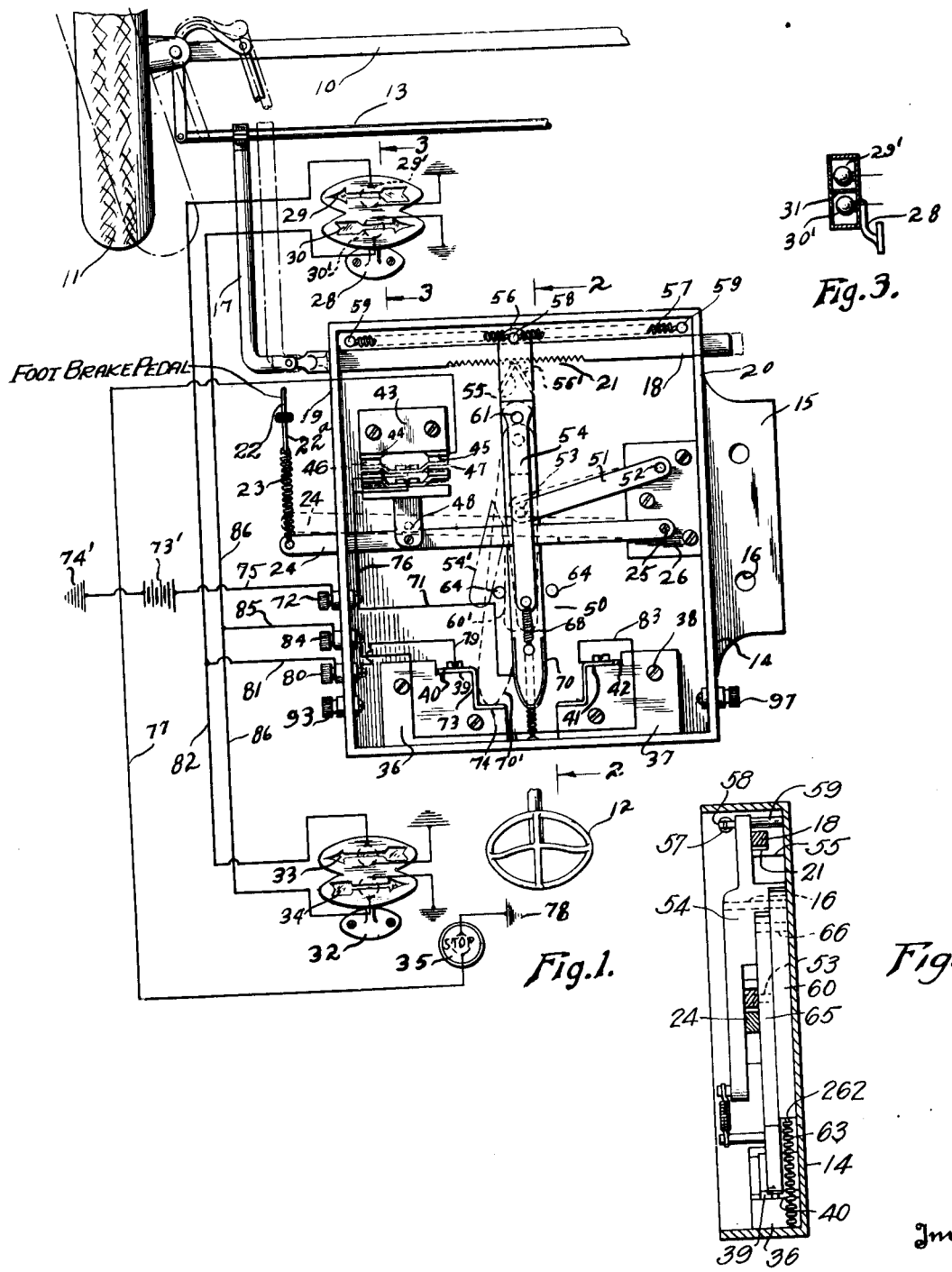
May 23, 1933.  M. MICHARICH  1,910,257
AUTOMOBILE DIRECTION SIGNAL
Filed Oct. 11, 1929  2 Sheets-Sheet 1

1,910,257

UNITED STATES PATENT OFFICE

MICHAEL MICHARICH, OF BRIDGEPORT, CONNECTICUT

AUTOMOBILE DIRECTION SIGNAL

Application filed October 11, 1929. Serial No. 399,023.

This invention relates to a direction signal mechanism for a vehicle such as an automobile, and has for an object to provide a mechanism which will operate a signal both at the front and the rear of the vehicle to indicate the direction the vehicle is about to turn automatically through the usual operation of the brake pedal and steering mechanism without the necessity of the driver having to consciously operate any additional mechanism.

It is a further object of this invention to provide a switch and signal mechanism which may be used in connection with a stop indicating signal such as is often supplied as standard equipment on automobiles, or which may be so connected in the absence of such signal to cause the rear direction signals to operate as a stop signal when the brake pedal is depressed and to operate as a direction signal after the brake pedal is released until the steering mechanism is straightened out.

With the foregoing and other objects in view, this invention comprises certain constructions, combinations and arrangements of parts as hereinafter set forth, disclosed and claimed as considered in connection with the accompanying drawings.

In these drawings:

Fig. 1 is a diagrammatic view of the switch mechanism and its operating details connected up to include the stop indicator.

Fig. 2 is a section on line 2—2 of Fig. 1 looking in the direction indicated by the arrows.

Fig. 3 is a section on line 3—3 of Fig. 1.

Figures 4, 5:
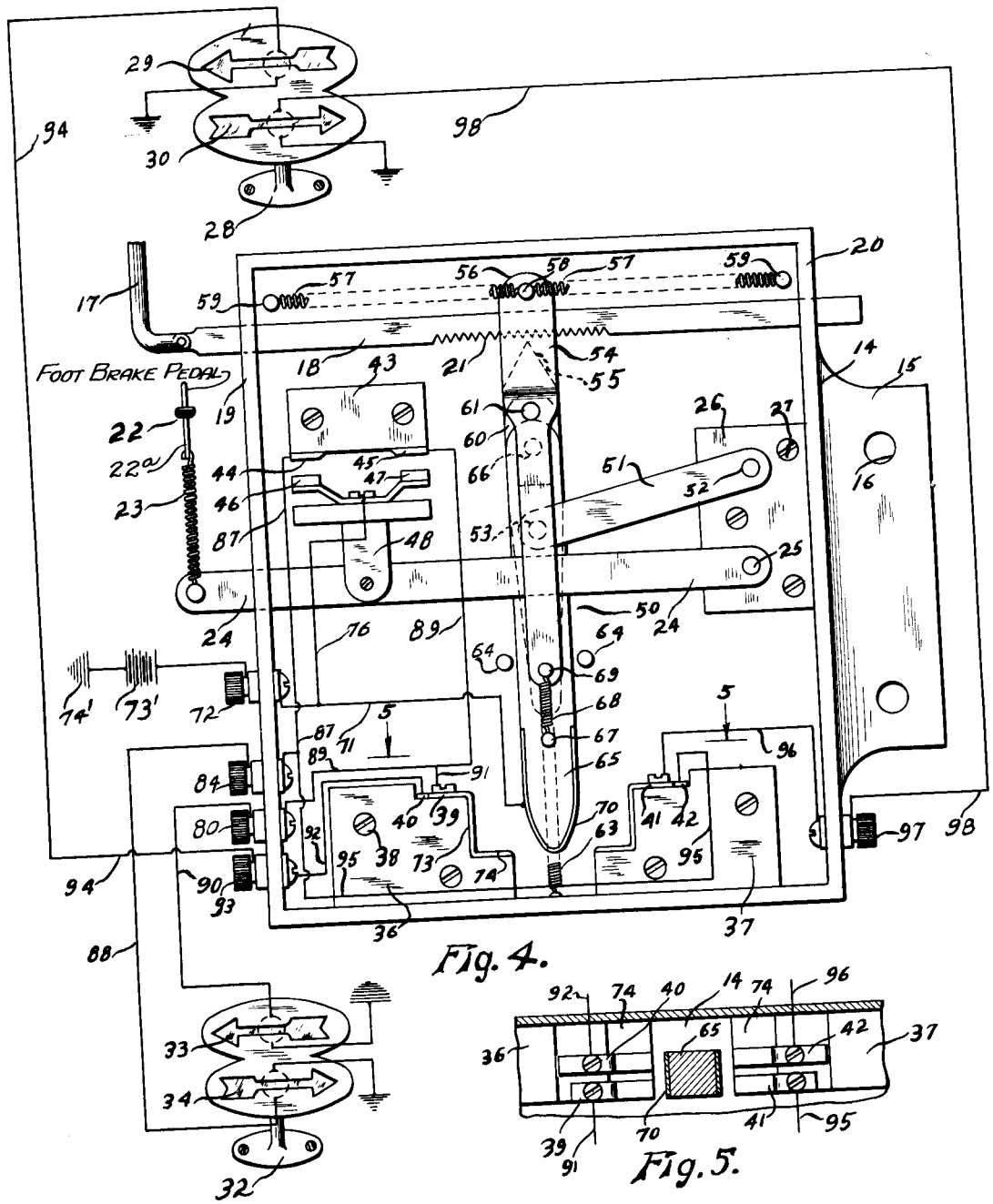
Fig. 4 is a somewhat larger diagrammatical view of the switch mechanism connected or wired so as to use the rear direction signals as a stop signal.
Fig. 5 is a section on line 5—5 of Fig. 4.

There is shown at 10 the front axle of a motor vehicle on which is the front wheel 11 whose direction is controlled from the steering wheel 12 through the usual steering mechanism including the tie rod 13. Affixed to the vehicle at any convenient place is the switch mechanism assembly box 14 having a flange 15 through the openings 16 of which the affixing means may be secured.

Affixed to the tie rod 13 is a connecting rod 17 to whose other end is pivotally affixed a slidable bar 18 which passes completely through openings in the opposite sides 19 and 20 of box 14 and has a toothed or rack portion 21, while the brake pedal 22 has a spring 23 connecting thereto a bar 24 which passes through an opening in side 19, the other end of bar 24 being pivoted at 25 to a base or block 26 affixed in box 14 as by screw 27, and it is through the actuation of slide bar 18 and pivoted bar 24 by the normal operation of the vehicle that the proper direction signals are automatically switched on and off at the appropriate times.

The spring 23 may be connected to the brake pedal 22 by any suitable means such as a bar 22a.

Affixed to the front of the vehicle so as to be visible to oncoming traffic and to traffic policemen is a double signal lamp 28 having an arrow 29 pointing to the left and another arrow 30 pointing to the right, and an electric light bulb 29' and 30' is placed behind each arrow respectively and separated by a partition 31 so that each bulb will light up only its particular direction arrow. For greater emphasis, these arrows may comprise colored glass, the arrow 29 to the left being red and the arrow 30 to the right being green. A similar lamp 32 having a similar left arrow 33 and a similar right arrow 34 is mounted on the rear of the vehicle so as to be visible to traffic in the rear, while the conventional stop light signal is shown at 35.

A pair of blocks 36 and 37 are affixed by screws 38 in box 14 at the opposite end to the end where slide bar 18 passes through the sides, block 36 being on the left of the center line and block 37 on the right of the center line, and each block has affixed thereto a pair of stationary contact members, which are step shaped as shown, the blocks 36 and 37 having been step-shaped to conform to the shape of the contacts, contacts 39 and 40 being located on left block 36 and contacts 41 and 42 being located on the right block 37. The contacts on left block 36 are for operating the left arrows 29 and 33, while those on the right block 37 are for operating the right arrows 30 and 34, as will be later described.

Another block 43 affixed to box 14 has a pair of contacts 44 and 45 against which a pair of movable spring arm contacts 46 and 47 are to be pressed by an arm 48 affixed on bar 24. As will be obvious, the depression of the brake pedal 22 will move bar 24 to bring these contacts together, and these contacts are to be wired or connected so as to either operate the stop signal 35 or to operate the arrows 33 and 34 to act as a stop signal, as will be later described.

A circuit closing contact member 50 adapted to contact with the contact members carried by either blocks 36 or 37 when the brake pedal 22 is depressed and the steering wheel 12 is turned, is composed of the following elements. A lever 51 is pivoted at 52 to a fixed support, here shown as block 26, and its other end has a pivotal connection 53 to a lever 54 which has a tooth or arrowhead 55 integral therewith. The end of lever 51 at the pivotal connection 53 also serves as a bearing for the pivoted bar 24 so that movement of bar 24 as a result of the depression of brake pedal 22 will serve to move the tooth 55 to the position 55' in contact with the toothed portion 21 of bar 18 and then spring 23 will yieldably hold it in contact while the brake pedal 22 is further depressed. As will be obvious, when the tooth 55 is in position 55' in engagement with teeth 21, any sliding movement of bar 18 will cause lever 54 to pivot about its pivotal connection 53 as a fulcrum. The end 56 of lever 54 has yieldable means affixed thereto tending to hold it in the central position midway between the contact blocks 36 and 37, said yieldable means comprising a pair of springs 57 affixed thereto at 58 and to the box 14 at 59. Another lever 60 is pivoted to lever 54 in alignment therewith at 61 while the end 62 of lever 60 has a yieldable means comprising a spring 63 affixed thereto and to box 14 tending to hold lever in the position shown in Fig. 4 with the point 55 out of engagement with rack 21, while a pair of stop members 64 prevent member 60 from being swung beyond position 60'. A circuit closing member 65 is pivoted in alignment with levers 54 and 60 to lever 60 at 66, and has a post 67 affixed near its other end which has a spring 68 affixed to the end of lever 54 at 69. This circuit closing member 65 has a contact 70 affixed to its end, and a lead wire 71 connects contact 70 to a binding post 72.

In operation, when the brake pedal 22 is depressed, bar 24 will swing about pivot 25 to press the contacts carried by arm 48 against the contacts carried by block 43 which will operate a stop light means at the rear of the vehicle, and at the same time, bar 24 will bear against the end of lever 51 and its pivotal connection 53 to press tooth 55 to the position 55' in mesh with teeth 21. The turning of steering wheel 12 will then have the effect of sliding bar 18 either to the right or to the left, according to which direction it is turned. This will have the effect of correspondingly swinging the compound switch member 50 about the fulcrum formed by the pivotal connection 53 to bring the contact member 70 into contact with the stationary contacts carried on either block 36 or 37. If turning to the left, contact 70 will be moved to the position 70', and be held against further movement against the side 73 in the step in the block as shown. Spring 68 will yield to allow lever 54 to pivot further to position 54' as the steering wheel 12 is further turned. At the same time spring 63 will yield to allow the end of contact 70 to ride up on the bottom 74 of the step, and then the force of spring 63 will have one component tending to draw it down against the bottom 74 and another component tending to draw it at right angles away from the side 73. This latter component, however, is counterbalanced as long as lever 54 is in position 54' by an opposite component from spring 68 tending to hold it against the side 73 of the step and also by friction of contact 70 on the stepped contact. After contact 70 has ridden up on the bottom 74 of the step, the tooth 55 will be held in mesh with teeth 21 without further assistance from bar 24, and will remain so after bar 24 returns to its full line position when the brake 22 is released. Then when the steering wheel 12 is straightened to bring bar 18 back to its original position, lever 54 will be returned from position 54' to the original aligned position. This will destroy the counterbalancing component of spring 68, which now will become a component tending to aid spring 63 in moving the contact 70 away from side 73, which will be greater than the component of spring 63 holding contact 70 against bottom 74, thus returning contact 70 to its original disengaged or open circuit position and allowing tooth 55 to disengage from teeth 21.

When the vehicle is equipped with a stop signal, the device may be wired or connected as shown in Fig. 1.

The current is supplied from the vehicle battery 73' whose negative side is grounded to the vehicle as at 74'. The battery 73' is connected by wire 75 to binding post 72. From the binding post 72, one wire 71 leads to contact 70 as described above and another wire 76 leads to the contacts 46 and 47 for the stop mechanism. Contact 47, when the brake pedal is depressed, closes a circuit through contact 45 and wire 77 to the stop signal 35 which is grounded at 78. Contact 39 on the left block 36 is connected by wire 79 to binding post 80 and thence by wire 81 to a common wire 82 leading to left arrows 29 and 33 which are grounded as shown. Similarly, contact 41 on the right block 37 has a wire 83 leading to binding post 84 and thence by wire 85 to a common wire 86 leading to right arrows 30 and 34, likewise grounded as shown. When wired as thus described, depression of the brake pedal 22 will light signal 35 and hold it lighted as long as the brake is held depressed, allowing it to go out when the brake is released. If the vehicle be approaching a corner which the operator is about to turn, he will first naturally always depress the brake pedal 22 to slow up the vehicle sufficiently, and then will turn wheel 12 to turn the corner before the brake pedal is released. This will have the effect of operating switch member 50 in a corresponding direction to move contact 70 into circuit closing position with contact 39 or 41, to thus light the corresponding arrows at the front and rear of the vehicle.

When the vehicle is not equipped with a stop signal, the device may be wired or connected as in Fig. 4. When the brake pedal 22 is depressed, the current from battery 73' will pass through wire 76 to contacts 46 and 47. Contact 44 is connected by wire 87 to binding post 84 and thence by wire 88 to right arrow 34 while contact 45 is connected by wire 89 to binding post 80 and thence by wire 90 to left arrow 33. In this case, when the brake pedal 22 is depressed, both right and left arrows 33 and 34 at the rear of the car will be lighted together, thus serving as a stop light. Contact 39 will be connected by wire 91 to wire 89 to also connect to the rear left arrow 33 while contact 40 will be connected by wire 92 to binding post 93 and thence by wire 94 to left arrow 29 at the front of the vehicle. Contact 42 on the right block 37 will be connected by wire 95 to wire 87 leading to the rear right arrow 34, while contact 41 will be connected by wire 96 leading to binding post 97 and thence by wire 98 to the front right arrow 30. When wired as thus described and shown in Fig. 4, depression of the brake pedal 22 will close the circuits through contacts 45 and 47, and 44 and 46 to light both rear left and right arrows 33 and 34, which when understood will thus indicate to the following traffic that the brake pedal is being held down, and thus serve as a stop light. If the driver then turns the steering wheel 12 for a left turn, switch member 50 will be shifted to move contact 70 into circuit closing position with both contacts 39 and 40 on left block 36. This will close the circuit to both front and rear left arrows 29 and 33, thus indicating to oncoming traffic, or to the traffic policeman at that corner that a left turn is about to be made. Inasmuch as both rear arrows 33 and 34 are lighted by contacts 44, 46 and 45, 47 as a result of the brake pedal being depressed, as the brake is released, the circuit through contacts 45 and 47, and 44 and 46 will be opened. However, as the circuit between 39 and 70 is being held closed, left arrow 33 will remain lighted and right arrow 34 will go out, thus indicating to following traffic also that a left turn is about to be made.

It will be obvious that the switch assembly box 14 and the switches therein may be identical as shown when used according to either system above disclosed, although in one system, that of Fig. 1, no use is made of certain parts, particularly contacts 40, 42, 44 and 46 or binding posts 93 and 97, but in manufacturing the device, these elements will be included so that the device may be used as desired according to either system.

Having thus set forth the nature of my invention what I claim is:

1. In a vehicle direction indicator of the character described, indicator means visible from the front of the vehicle, indicator means visible from the rear of the vehicle, means for actuating said indicator means, a direction switch member included in said actuating means, said actuating means being operable by the brake pedal to operate the rear indicator means to show that the brake pedal is being depressed and to simultaneously mechanically connect said direction switch member with the vehicle steering mechanism for operation thereby to actuate the front indicator means to show the direction that the steering mechanism is turned, and to actuate the rear indicator means to show the direction that the steering mechanism is turned, said direction switch member continuing to actuate the rear indicator means after the brake pedal is released.

2. In a vehicle direction signal of the character described, a switch mechanism, means in said mechanism connected with the steering mechanism, a compound switch member having means actuated by depression of a control pedal of the vehicle to move said switch member into mechanical connection with said steering mechanism means whereby the switch member is actuated by the steering mechanism means, stationary electrical contact members on each side of said switch member, a movable contact on said switch member adapted, when the switch member is actuated as the steering mechanism is turned, to close a direction indicating circuit through one of the said stationary contact members, and means to cooperate with said contact members to cause them to remain closed until the steering mechanism is straightened.

3. In a vehicle direction indicating device, a compound switch mechanism including a slidable rack bar connected to a steering mechanism and a pivoted actuating bar connected to a brake lever, a pair of stepped stationary contact members and a compound pivoted contact member adapted to close a circuit through either of said stepped contact members, said compound member comprising a lever pivoted at one end to a fixed support, a toothed lever to which the other end of said pivoted lever is also pivotally connected, said pivotal connection also serving as a bearing against which the actuating bar may operate to move the toothed lever into mesh with the rack bar, said toothed lever having yieldable means tending to return it to non-meshing position, a circuit closing contact member pivoted to said toothed member, yieldable means tending to align said circuit closing member with said toothed member, and yieldable means tending to hold said circuit closing contact member in open circuit position.

4. In a vehicle direction indicating device, a compound switch mechanism including a slidable rack bar connected to a steering mechanism and a pivoted actuating bar connected to a brake lever, a pair of stepped stationary contact members and a compound pivoted contact member adapted to close a circuit through either of said stepped contact members, said compound member comprising a lever pivoted at one end to a fixed support, a toothed lever to which the other end of said pivoted lever is also pivotally connected, said pivotal connection also serving as a bearing against which the actuating bar may operate to move the toothed lever into mesh with the rack bar, said toothed lever having yieldable means tending to return it to non-meshing position, a circuit closing contact member pivoted to said toothed member, yieldable means tending to align said circuit closing member with said toothed member, and yieldable means tending to hold said circuit closing contact member in open circuit position, said last yieldable means including a lever pivoted to said toothed member and to said circuit closing member.

5. In a direction signal for motor vehicles, a plurality of direction indicators, means mounting a lever for both swinging and longitudinal movements, a pair of circuits one for each indicator closed and opened by the swinging movements of said lever, a movable operating member connected to the steering mechanism for movement in opposite directions thereby, cooperative operating means on the lever and said movable member normally out of engagement, and means connected to the brake lever capable of shifting said lever on depression of the brake lever to bring said cooperative means into operative relation so that operation of the steering mechanism will swing the lever to close one of said circuits.

6. In a direction signal for motor vehicles, a plurality of direction indicators, means mounting a lever for both swinging and longitudinal movements, an operating means for each indicator controlled by swinging movements of said lever, a notched member movable transversely of said lever, means for connecting said member with the steering mechanism, operative means on the lever capable of engaging said notched member for operation thereby, means for normally holding said operative means out of engagement with said notched member, and means connected to the brake pedal to shift said lever into engagement with the notched member for operation thereby.

7. In a direction signal for motor vehicles including a control lever, a plurality of direction indicators, a second lever, means for operating said latter lever for both swinging and longitudinal movements, a pair of circuits one for each indicator closed and opened by the swinging movements of said second lever, a movable operating member connected with the steering mechanism for movement in opposite directions thereby, cooperative operating means on the second lever and said movable member normally out of engagement, and means connected with said control lever capable of shifting the second mentioned lever on operation of the control lever to bring said operative means into operative relation so that operation of the steering mechanism will swing the second lever to close one of said circuits.

8. In a direction signal for motor vehicles having a control lever, a plurality of direction indicators, a second lever, means mounting said latter lever for both swinging and longitudinal movements, an operating means for each indicator controlled by swinging movements of said second lever, a notched member movable transversely of said second lever, means for connecting said member with the steering mechanism, operative means on the second lever capable of engaging said notched member for operation thereby, means for normally holding said operative means out of engagement with said notched member, and means connected with the control lever to shift said second lever into engagement with the notched member for operation thereby.

In testimony whereof I affix my signature.

MICHAEL MICHARICH.